(12) United States Patent
Quinlan et al.

(10) Patent No.: US 8,355,947 B2
(45) Date of Patent: Jan. 15, 2013

(54) METHODS AND SYSTEMS FOR PROCESSING REBATES

(75) Inventors: Christopher F Quinlan, Wilmington, DE (US); Sean Kirker, Wilmington, DE (US)

(73) Assignee: The Ohana Companies, Inc., Wilmington, DE (US)

( * ) Notice: Subject to any disclaimer, the term of this patent is extended or adjusted under 35 U.S.C. 154(b) by 175 days.

(21) Appl. No.: 12/595,553

(22) PCT Filed: Apr. 14, 2008

(86) PCT No.: PCT/US2008/060262
§ 371 (c)(1),
(2), (4) Date: Apr. 9, 2010

(87) PCT Pub. No.: WO2008/128199
PCT Pub. Date: Oct. 23, 2008

(65) Prior Publication Data
US 2010/0198673 A1    Aug. 5, 2010

Related U.S. Application Data

(63) Continuation-in-part of application No. 10/768,639, filed on Feb. 2, 2004, which is a continuation-in-part of application No. 10/661,886, filed on Sep. 15, 2003, which is a continuation-in-part of application No. 10/098,948, filed on Mar. 15, 2002, which is a continuation-in-part of application No. 09/495,819, filed on Feb. 2, 2000, now Pat. No. 6,748,365.

(60) Provisional application No. 60/923,012, filed on Apr. 12, 2007.

(51) Int. Cl.
*G06Q 30/00* (2012.01)
(52) U.S. Cl. ..................................... 705/14.1
(58) Field of Classification Search .................. 705/14.1
See application file for complete search history.

(56) References Cited

U.S. PATENT DOCUMENTS
7,668,747 B2 *    2/2010    Murphy et al. ............ 705/14.26
* cited by examiner

*Primary Examiner* — Daniel Lastra
(74) *Attorney, Agent, or Firm* — Duane Morris LLP

(57) ABSTRACT

The invention provides efficient and convenient rebate systems and methods which facilitate application of the value of a rebate redeemed by a purchaser to additional purchases by the purchaser prior to termination of a rebate redemption session.

9 Claims, 11 Drawing Sheets

1000 http://www.acme.com

ACME RETAIL STORE

Signing up is quick and simple. Just provide us with the necessary information. Fill out the form below and you can begin enjoying the simplicity of ACME rebates.

1001

Title: ☐
First Name: ☐
Last Name: ☐
Address 1: ☐
Address 2: ☐
City: ☐
State: ☐
Zip: ☐
Email: ☐
Phone #: ☐
Gender: ☐
Birth Year: ☐

1003

How often do you shop at Acme? ☐
Have you ever used our repair and installation service? ☐
Have you every used our in store pick-up? ☐
Do you have an ACME rewards card? ☐
Do you own a high definition television? ☐

(submit)

METHODS AND SYSTEMS FOR PROCESSING REBATES

CROSS REFERENCE TO RELATED APPLICATIONS

This application claims benefit of priority to U.S. provisional application Ser. No. 60/923,012, filed Apr. 12, 2007.

This application is a continuation in part of U.S. application Ser. No. 10/768,639 to Quinlan, et al. filed on Feb. 2, 2004 which is a continuation in part of U.S. application Ser. No. 10/661,886 to Quinlan, et al. filed on Sep. 15, 2003 which is a continuation in part of U.S. application Ser. No. 10/098,948 to Quinlan, et al. filed on Mar. 15, 2002 which is a continuation-in-part of Ser. No. 09/495,819 to Quinlan, et al. filed on Feb. 2, 2000 and now patented as U.S. Pat. No. 6,748,365.

FIELD OF THE INVENTION

The present invention relates generally to methods and systems for processing rebates and more specifically to methods and systems that increase the redemption rate of rebates and provide a return on investment for a retailer issuing a rebate.

BACKGROUND OF THE INVENTION

Typically, a rebate offer is made by a manufacturer or retailer to a retail purchaser upon the purchase of a designated product or service. Subsequent to the purchase transaction the purchaser undertakes rebate redemption by providing information to the entity responsible for fulfillment of the rebate offer. The responsible entity verifies the rebate claim and transfers the promised rebate value to the purchaser.

The product and service purchasing process can be time consuming for a purchaser. Many of today's products and services, for example, computers and other electronic products and services are complex. In many cases more than one component must be purchased to provide all available features of a purchased product or service. A purchaser of such a product or service may neglect to purchase the additional components with the purchased item at the time of purchase.

In some cases a purchaser may lack sufficient funds to purchase additional items at the time the first item is purchased. Even when the first purchased item is associated with a cash rebate offer, a purchaser has no way to immediately apply the cash rebate to offset the purchase price of additional items. With existing systems the purchaser wishing to apply a rebate to purchase additional products must complete the transaction associated with the rebate. Later the purchaser initiates the rebate redemption process by making a claim and waits for the completion of the redemption process and delivery of the rebate value before he or she can apply the rebate to an additional purchase. In many cases the purchaser must return to a store to purchase additional items, applying the redeemed rebate value to the purchase price of the additional items. This delay is frustrating, time consuming and expensive for many purchasers. As a result the use of otherwise valuable rebates to offset the cost of purchases is discouraged.

In addition, further trips to stores or Internet searches may need to be conducted before the purchaser can locate and obtain desired additional items. Further, many purchasers are unaware of the range, function, availability or cost of the various products and services that may be of interest to the purchaser of the original item. At the same time, vendors of products and services are faced with the challenge of identifying those purchasers who may be interested in certain items. Even if potential interested purchasers are identified, the vendor still faces the challenge of bringing the items to the attention of potentially interested purchasers. Further, even if brought to the attention of an interested purchaser, that purchaser may not have sufficient funds to purchase the item at the time of the offer.

Thus, inefficiencies exit in the marketplace for both vendors and consumers in the rebate redemption process. Because of the aggravation and delay involved in redeeming rebates, many purchasers who are otherwise eligible do not take full advantage of rebate offers by applying the rebate value to subsequent purchases.

Retailers also encounter frustrations in the rebate process due to limitations of conventional rebate processing systems. Because a rebate cannot be redeemed until a purchaser leaves the issuing retailer's establishment, the issuing retailer risks losing the benefit that would otherwise be obtained if the value of the rebate value were made available to the purchaser at the time of the original purchase. In that case, the issuing retailer is more likely to gain an additional sale through the purchaser's use of his or her rebate value while the retailers other offers are easily accessible.

Therefore there is a need for methods and systems for redeeming rebates and other promotional offers that enable purchasers to apply the value of these offers to offset the purchase cost of additional products and services of relevance to an individual purchaser. Further there is a need for method and systems that inform purchasers of products and services that may be of particular interest to them as individual purchasers.

It is further desirable for retailers to be enabled to provide redemption options that are more likely to result in application of the rebate value to additional purchased from the issuing retailer. It is further desirable that product and service offerings tailored to an individual purchaser's needs and desires be made available to the purchaser in a timely manner without the need to wait for completion of a lengthy redemption process and without the need for further searching and additional shopping excursions to purchase accessories and other products and services.

U.S. Pat. No. 6,748,365 to Quinlan, et al. is directed to method and system for processing product marketing rebate claims submitted by a consumer in satisfaction of a rebate offer. An electronic file transfer is received from a point-of-sale data processing and storage system comprising purchase data records, each record comprising the list of products purchased and the transaction serial number for a qualified transaction in which at least one designated product was purchased. Each stored data record is associated with a purchase data record having an identical serial number, and the records are processed to validate a purchaser's rebate claim. If a purchaser has a plurality of valid rebate claims the value of each rebate offer is determined. The monetary value of the aggregated rebate claims is transferred to the purchaser. At that point the rebate process for that transaction or aggregated transactions is terminated.

U.S. patent application Ser. No. 10/661,886 (Cont) to Quinlan, et al. is directed to method and system for processing product marketing rebate claims submitted by a purchaser in satisfaction of a rebate offer. An electronic file transfer is received from a point-of-sale data processing and storage system comprising purchase data records, each record comprising the list of products purchased and the transaction serial number for a qualified transaction in which at least one designated product was purchased.

Each stored data record is associated with a purchase data record having an identical serial number, and the records are processed to validate a purchaser's rebate claim. The value of the rebate offer is transferred to the purchaser. This system additionally provides for optional integration of paper-based and smart/credit/debit-card-based rebate claims. After transferring the value of a rebate to a smart/credit/debit card, the rebate process for that transaction or aggregated transactions is terminated.

U.S. patent application Ser. No. 10/098,948 (CIP) to Quinlan, et al. is directed to method and system for processing product marketing rebate claims submitted by a consumer in satisfaction of a rebate offer. An electronic file transfer is received from a point-of-sale data processing and storage system comprising purchase data records, each record comprising the list of products purchased and the transaction serial number for a qualified transaction in which at least one designated product was purchased.

Each stored data record is associated with a purchase data record having an identical serial number, and the records are processed to validate a purchaser's rebate claim. The value of the rebate offer is transferred to the consumer. Embodiments are discussed relating to transactions on a computer network, making rebate claims via a wireless communications device, and use by membership clubs or in conjunction with loyalty cards or other designated cards.

U.S. patent application Ser. No. 10/768,639 (CIP2) directed to methods and apparatus for redeeming promotional offers in product marketing rebates wherein the purchaser is not required to submit information as to the identity of the product/services purchased in order to receive the value associated with the promotional offer at some time after the purchase transaction.

While each of the above systems and methods provide a convenient way to process rebate claims, each has the same drawbacks. That is, the redemption process is carried out in isolation from a retail sales environment where additional products and services could be promptly offered to a purchaser in exchange for rebate value. Instead existing systems typically deliver the rebate value to the purchaser at a time and in a place that is sub optimal for a timely offering of additional products and services to the purchaser. The problem of efficiently and cost effectively enabling a purchaser to apply the monetary value of a received rebate claim to subsequent purchases in a timely manner, and to offers that may be of particular interest to an individual purchaser remains unsolved. After the monetary value of the rebate is received, a purchaser still faces inconvenience, delay and possible extra costs, for example travel costs, when applying the transferred monetary value to purchase additional items and/or services.

Accordingly there remains a need for rebate systems and methods which incorporate flexibility to facilitate application of a monetary value associated with redeemed rebate claims to subsequent purchases. Further, there remains a need to bring vendors of products and services together with potentially interested purchasers such that purchasers can easily and efficiently apply there available rebate values to purchase additional products and services from the issuing retailer.

SUMMARY OF THE INVENTION

The invention provides efficient and convenient rebate systems and methods which accommodate application of value of a received rebate claim to subsequent purchases by the rebate recipient.

DESCRIPTION OF THE DRAWING FIGURES

These and other objects, features and advantages of the invention will be apparent from a consideration of the following detailed description of the invention considered in conjunction with the drawing figures in which like features are indicated with like numerals. It is understood the various drawing features are arbitrarily expanded or reduced for clarity. Included are the following drawing figures:

FIG. 10 illustrates a graphical user interface (GUI) provided in accordance with an embodiment of the invention enabling a purchaser to provide purchaser information to a system configured in accordance with embodiments of the invention.

DETAILED DESCRIPTION OF THE INVENTION

In accordance with the present invention, there are provided herein methods and systems for processing rebates. Typically three parties are involved in the rebate process. One party is a manufacturer of a product with which a rebate is associated. Another part is a retailer who sells the product with which a rebate is associated via a point of sale (POS) system. Another party is a rebate fulfillment house. Rather than process thousands of redemptions themselves, manufacturers and retailers frequently contract with a fulfillment house to open and sort mail, log in consumer data, and, if all requirements have been met, issue rebate checks.

Terms, Definitions and Symbols

The following terms are used as defined herein:

The term "Rebate" as used herein refers to an amount paid by way of reduction, return, or refund on what has already been paid or contributed.

The term "Rebate Fulfillment House" is used herein to refer to a company that processes rebates for manufacturers and retailers. The systems and methods used by a rebate fulfillment house in the processing of rebates are referred to herein as "rebate processing systems" and "rebate processing methods" respectively.

The term "Retailer" is used herein to refer to a seller of goods or merchandise from a fixed location, such as a department store or kiosk, or by post, in small or individual lots for direct consumption by a purchaser. The term "Retailer" further includes providers of services, such as delivery or repair services. In commerce, a retailer buys goods or products in large quantities from manufacturers or importers, either directly or through a wholesaler, and then sells smaller quantities to an end-user, or "purchaser". A "Retailer" is, in some cases also a manufacturer.

The term "Purchaser" as used herein refers to individuals or businesses that purchase goods, products or services from a retailer.

The term "Receipt" as used herein refers to a written or printed acknowledgement that a specified article or sum of money has been received as an exchange. The receipt acts as the title to the property obtained in the exchange transaction. The printed record given to a purchaser at a point of sale typically lists the purchases made, the total amount of the transaction including taxes, discounts and other adjustments, the amount paid and the method of payment. A receipt typically includes a barcode enabling a retailer to reference corresponding transaction information from a database of previous purchases, thus, for example, authenticating a return.

The term "vendor" as used herein refers to a seller of a good or service whether the seller is a manufacturer or a retailer.

Figure 1:
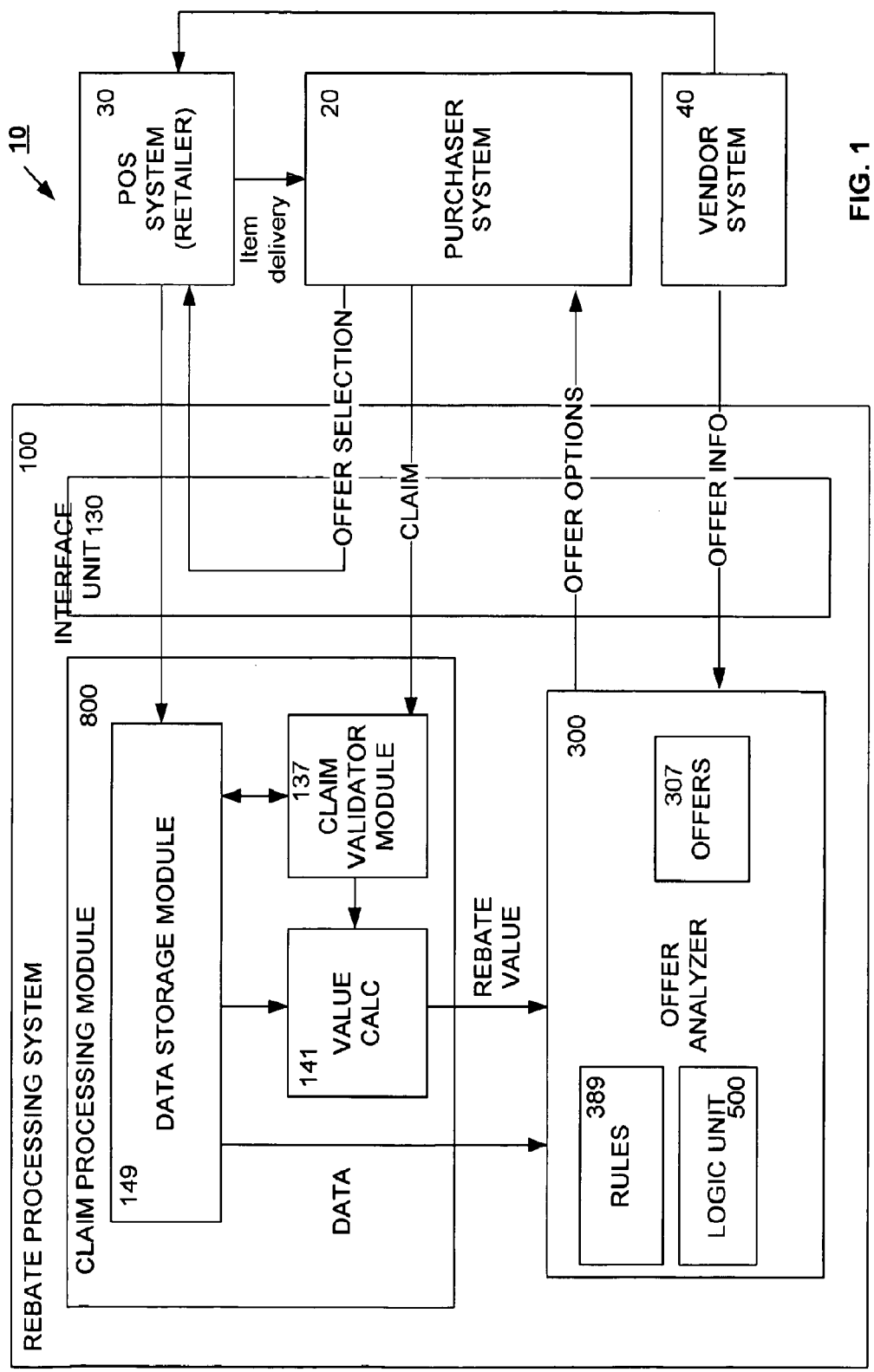
FIG. 1 is a high level block diagram of a system for processing rebates according to an embodiment of the invention.

FIG. 1 Rebate Processing System 100 Block Diagram

FIG. 1 is a block diagram of a communication network 10 suitable for implementing a rebate processing system 100 according to various embodiments of the invention described herein. In one embodiment of the invention network 10 is implemented using a global computer information network, such as is commonly referred to in the art as the "Internet" or "World Wide Web". Network 10 comprises any number of sites ("websites") which a purchaser, retailer, manufacturer, or other system is enabled to access when access permission is granted by a site administrator. In other embodiments of the invention at least a portion of network 10 comprises a local area network (LAN) or a regional area network. Both wired and wireless networks and combinations thereof are suitable for implementing network 10 in whole or in part.

Network 10 comprises a rebate processing system 100 configured for communication with a Retailer Point of Sale (POS) system 30 and also for communication with a purchaser system 20. In some embodiments of the invention rebate processing system 100 is further configured for communication with a vendor system 40. Rebate processing system 100 comprises a claim processing module 800 coupled to an offer analyzer 300. An interface unit 130 provides input/output processing functions and graphical user interfaces for use in conjunction with the various embodiments of the invention. In one embodiment of the invention the components comprising rebate processing system 100 are implemented by a processor configured to provide the component functions described herein.

Claim processing module 800 communicates with a POS system 30 via interface unit 130. Claim processing module 800 also communicates with a purchaser system 20 via interface unit 130. In some embodiments of the invention claim processing module 800 communicates with a vendor system 40 via interface 130. Claim processing module 800 comprises a rebate value calculator 141 coupled to a data storage module 149.

A claim validation module 137 is coupled to data storage module 149 and, according to some embodiments of the invention, to value calculator 141. Data storage module 149 receives information from POS system 30 via interface unit 130. According to some embodiments of the invention information is uploaded from POS system 30 at regular intervals. For some embodiments of the invention information is uploaded from POS system 30 at the time of a transaction. It will be recognized upon reading this specification that a variety of schedules for uploading information from POS system 30 are possible. All of these remain within the scope of the present invention.

Claim processing module 800 stores uploaded information in data storage module 149. Uploaded information includes, but is not limited to, data related to purchase transactions, data related to purchasers, and data related to purchases. Data related to purchase transactions includes, but is not limited to, a transaction serial number uniquely identifying each purchase transaction executed by POS system 30. Data related to purchases includes, but is not limited to data uniquely identifying an individual purchaser, or a group of purchasers. Data related to purchases includes, but is not limited to an indication of each item purchased during a transaction and an indication of rebates associated with the items purchased during a transaction, if any.

Offer analyzer 300 comprises a rules unit 389 a logic unit 500 and an offer information storage unit 307. Offer analyzer 300 receives information from data storage module 149 and information about rebate value from rebate value calculator 141. Rebate value calculator 141 is configured to determine a rebate value for at least one rebate claim received from purchaser system 20. Rebate value calculator 141 makes the determination based on stored information about the rebate associated with the claim. In one embodiment of the invention the information about rebate value is provided by a vendor of the product associated with a rebate. The information about rebate value is provided by the vendor to at least one of, a retailer and rebate processing system 100. In some embodiments of the invention information about the rebate value is provided by a vendor to a retailer. System 100 periodically uploads information about rebate values from a retailer system to system 100 where the information is stored and made available to rebate calculator 141.

Logic unit 500 applies rules from rules module 389 to select offers from offer information storage unit 307. Offer analyzer 300 provides the selected offers to a purchaser system 20 via interface unit 130. In one embodiment of the invention the selected offers are provided to purchaser system 20 during a rebate claim session.

Figure 12:
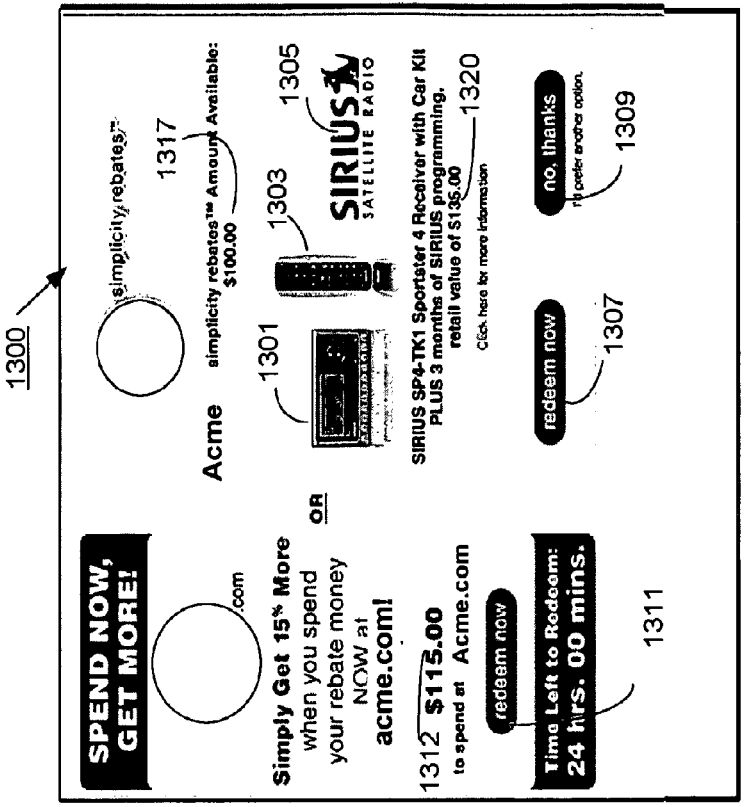
FIG. 12 illustrates a graphical user interface (GUI) in accordance with an embodiment of the invention wherein offers comprise services.
Figure 13:
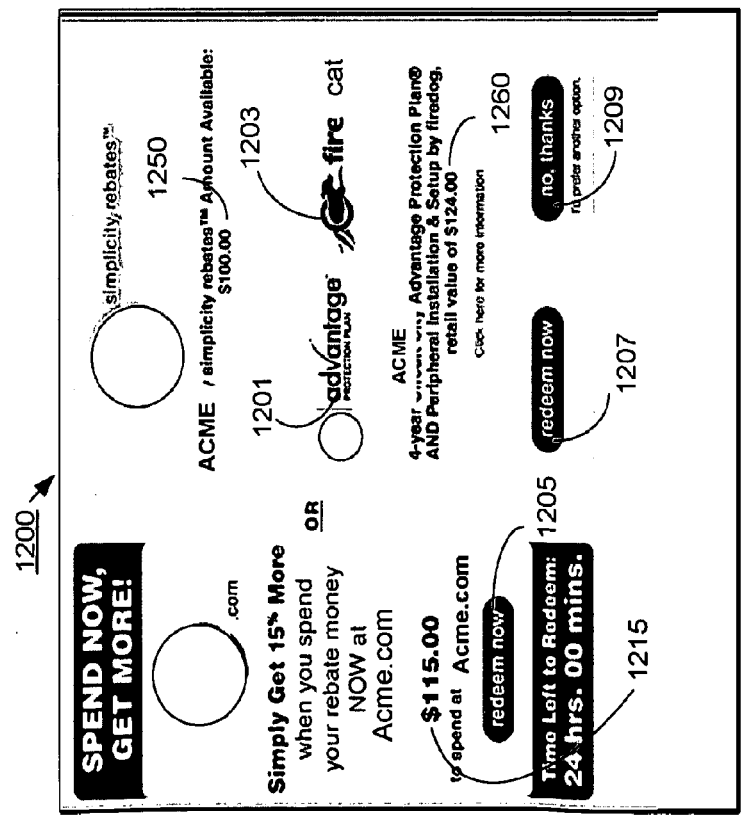
FIG. 13 illustrates a graphical user interface (GUI) provide by a rebate processing system of the invention wherein offers comprise goods and services.

The offers are provided via a graphical user interface provided by interface unit 130 for display on a display device of purchaser system 20. FIGS. 12 and 13 illustrate an example graphical user interface suitable to implement an offer GUI according to embodiments of the invention. The graphical user interface enables a purchaser to select, during the rebate claim session, at least one item comprising the offer. Rebate processing system 100 applies a rebate value associated with the purchaser toward the purchase price of the at least one item. In that manner, a purchaser is enabled to apply a rebate value to further purchases during the same on-line session in which the purchaser redeems the value of the rebate.

Figure 2:
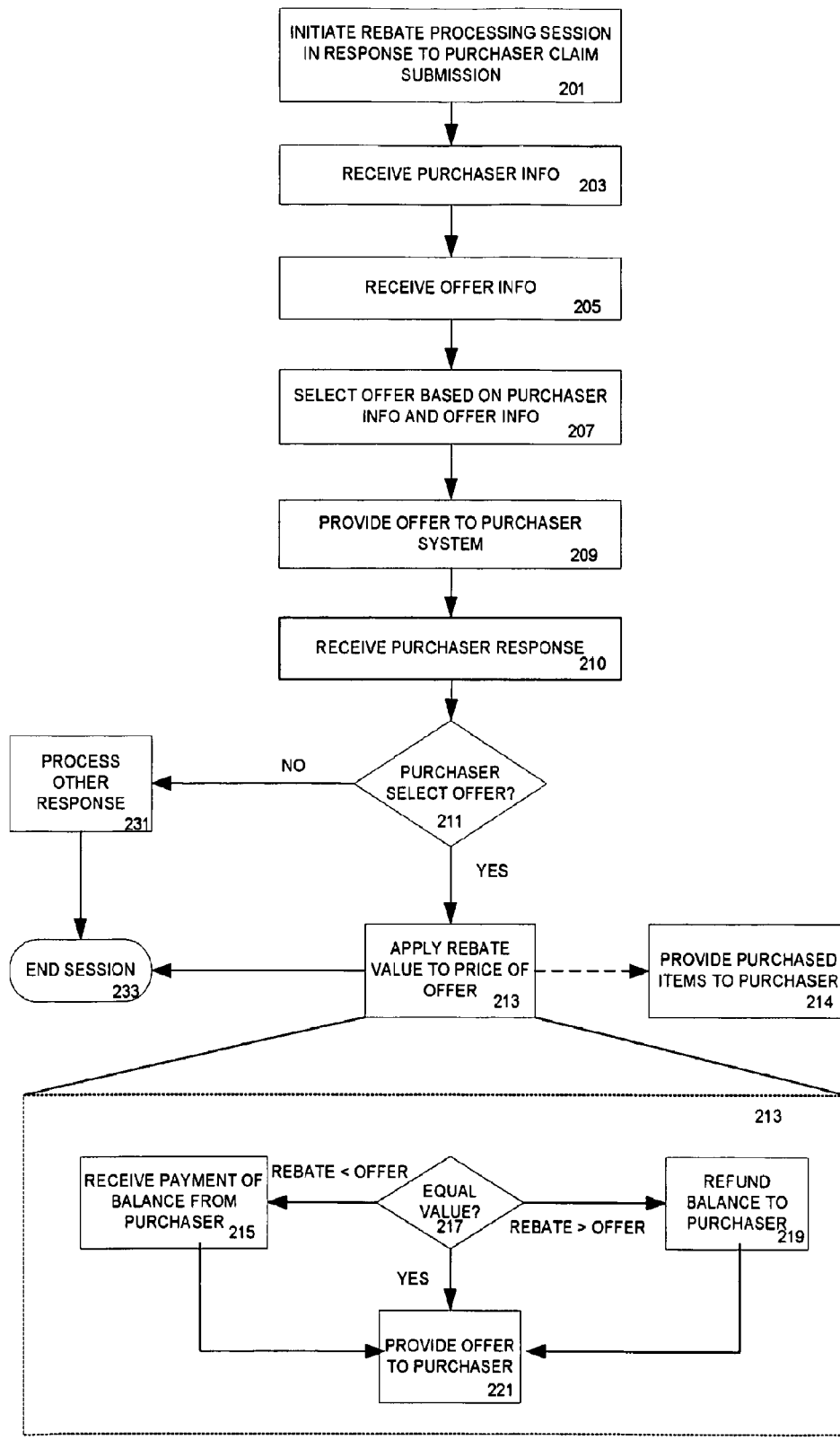
FIG. 2 is a flowchart depicting a method for redeeming promotional offers according to an embodiment of the invention.

FIG. 2 Method for Processing Rebates

FIG. 2 illustrates a method for processing rebates according to an embodiment of the invention. The method is carried out during an online rebate redemption process. In other words, a purchaser initiates an online rebate redemption process by accessing a rebate redemption system. In some embodiments of the invention accessing a rebate redemption system is accomplished by logging onto a website designated for the redemption of a purchaser's rebate. The website provides a first GUI enabling a purchaser to initiate a rebate redemption session. (Example illustrated in FIG. 9 at 901).

Figures 7, 8:
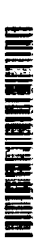
FIG. 7 illustrates an example first receipt according to one embodiment of the invention.
FIG. 8 illustrates and example second receipt according to one embodiment of the invention.

Subsequent to initiating a rebate session the rebate processing system 100 provides the purchaser system with a second GUI (example illustrated in FIG. 10) enabling the purchaser to enter information about the purchaser. Also during the session a third GUI (example illustrated in FIG. 11) enables a purchaser to enter information found on the purchaser's receipt (Example illustrated in FIG. 7) associated with a purchased item for which the purchaser is making a rebate claim. System 100 uses the receipt information to validate the purchaser's rebate claim. The steps described below are carried out before the termination of the rebate redemption session.

According to step 201 a rebate processing session is initiated in response to a purchaser accessing a rebate redemption system, for example via a website, and indicating the purchaser's intent to redeem a rebate. The purchaser provides a rebate claim including receipt information identifying at least one item with which a rebate is associated.

According to step 203 purchaser information is received from a source of purchaser information and stored in a purchaser information record.

According to step 205 at least one offer, including offer information is received from a vendor and stored in an offer record.

According to step 207 an offer is selected from the received offer based at least in part upon at least one of stored purchaser information and stored offer information. In one embodiment of the invention stored offer information includes rebate value.

According to step 209 an offer is selected from the offer store based at least in part on the purchaser information, in part on the determined rebate value and in part on the offer information;

According to step 211 at least one offer is provided to the purchaser.

According to steps 213 and 215, if the purchaser elects to accept the offer the rebate value is applied to the purchase price of the offer.

According to steps 213 and 217 if the purchaser declines the offer, the rebate process continues in a conventional manner.

In one embodiments of the invention the step 213 of applying the rebate value to the price of the offer includes the following optional steps.

According to step 217 if the rebate value is equal to the offer value the offer is provided to the purchaser at step 221 and the process ends.

According to step 217 if the rebate value is greater than the offer value the difference is provided to the purchaser at step 219. Next, at step 221 the offer is provided to the purchaser.

According to step 217 if the rebate value is less than the offer value payment of the difference is received from the purchaser at step 215. The offer is then provided to the purchaser at step 221.

Figure 3:
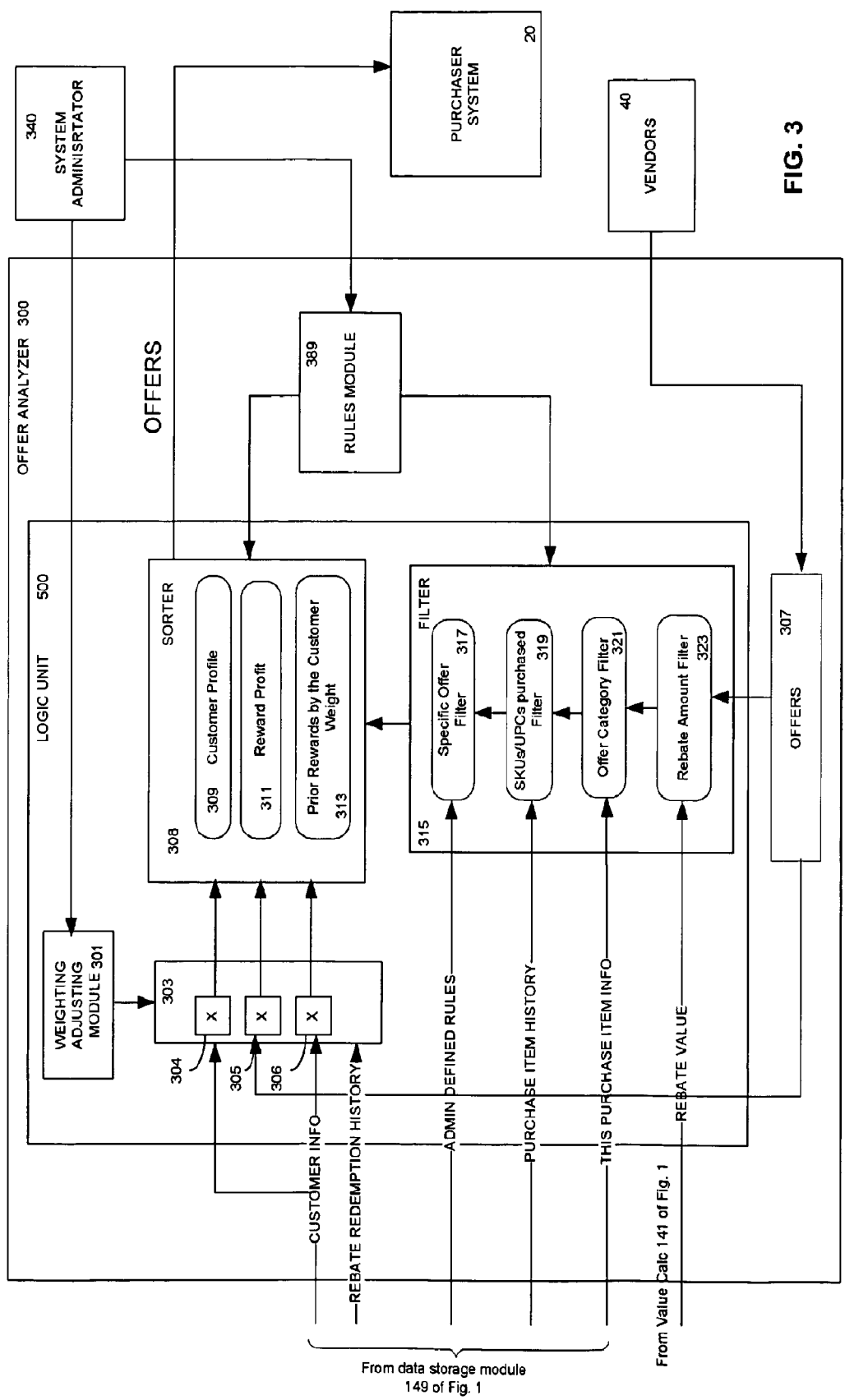
FIG. 3 is a block diagram of an offer analyzer of the type illustrated in FIG. 1 according to an embodiment of the invention.

FIG. 3 Offer Analyzer 300

FIG. 3 is a block diagram of an offer analyzer 300 suitable for use in the rebate processing system 100 illustrated in FIG. 1. Offer analyzer 300 comprises a logic unit 500 coupled to a rules module 389. In one embodiment of the invention an administrative system 340 is configured to communicate with offer analyzer 300 to enable a system administrator to manually modify the contents of rules module 389. Administrative system 340 is further configured to enable a system administrator to manually adjust operations carried out by logic unit 500.

Offer analyzer 300 further comprises an offer module 307 configured for communication with logic unit 500. At least one vendor system 40 is configured to communicate with offer module 307 to provide information about items and services comprising vendor offers. This information is transferred from vendor system 40 to offer module 307. It will be understood by those of ordinary skill in the art upon reading this specification that the embodiments of the invention described herein are not limited with respect to a number of vendor systems communicating with rebate processing system 100. Only one vendor system 40 is illustrated in FIG. 3 solely for ease of discussion.

Offer analyzer 300 includes an "offers" output configured for communication with a purchaser system 20. Offer analyzer 300 provides the results of an offer analysis to a purchaser via the "offers" output. The results are provided prior to the termination of a rebate redemption session.

Logic unit 500 comprises a filter module 315. In one embodiment of the invention filter module 315 is optionally coupled to a sorter module 308. Also coupled to sorter module 208 is a weighting unit 303. Weighting unit 303 comprises scalers 304, 305 and 306. Scalers 304-306 operate on values provided at corresponding scaler inputs such that a weight is applied to the input value in accordance with a weighting factor.

Weighting factors are provided by weight adjusting module 301. In one embodiment of the invention a weighting factor is determined based on a selected rule from rule module 389. In another embodiment of the invention a weighting factor is determined manually by a system administrator via administrator system 340. Weighted outputs of weighting unit 303 are provided to an offer sorter 308.

Information related to offers is stored in offer module 307. System 100 determines whether or not an offer will be made to a purchaser. If system 100 determines an offer will be made, offer analyzer determines which offers of all offers comprising offer module 307 will be provided to a purchaser. To make this determination offer analyzer 300 filters the offers in offer module 307.

A rebate amount filter 323 selects offers from offer module 307 that fall within a range of a determined rebate value.

An offer category filter 321 determines which of all the offers falling within the determined range of rebate value, will be candidates for offering to the purchaser.

An items purchased filter determines if any of the candidates passing through category filter 321 have already been purchased by the purchaser.

A specific offer filter 317 applies a rule to determine which of the candidate offers not previously purchased by the purchaser will be offered to the purchaser. The output of specific offer filter 317 is at least one offer to be provided to a purchaser.

In some embodiments of the invention the offers provided at the output of specific offer filter 317 are sorted by a sorting module 308. In that manner, offers may be presented to a purchaser in a predetermined order. First sorter 313 receives the offers from specific offer filter 317. First sorter 313 determines if any of the offers have been previously presented to this customer. If an offer has been previously presented it is given a lower weight than offers not previously presented. The output of first sorter 313 comprises a first list of offers in weighted order, for example, from highest weight to lowest weight.

Second sorter 311 assigns a weight to each item in the first list of offers based on profit margin associated with sale of the offered item. For example, those items in the first list associated with higher profit margins are assigned a higher weight than items in the first list associated with lower profit margins. In that manner, a second list of items is provided wherein the items of the first list are rearranged with higher profit margins items tending to appear higher on the offer list than lower profit margin items.

A third sorter 317 assigns a weight to each item on the second list based on a purchaser profile comprising purchaser characteristics. As a result, those items on the second list that are more closely correlated with a purchaser preference, as indicated on the purchaser preference profile, are assigned a higher weight than those items less closely correlated with a purchaser preference. Third sorter 317 provides a third list wherein items from the second list more closely correlated with purchaser preferences tend to appear higher on the third list than items less closely correlated with purchaser preferences. The third list is then provided for display to a purchaser 50 on a purchaser system 20.

Figure 4:
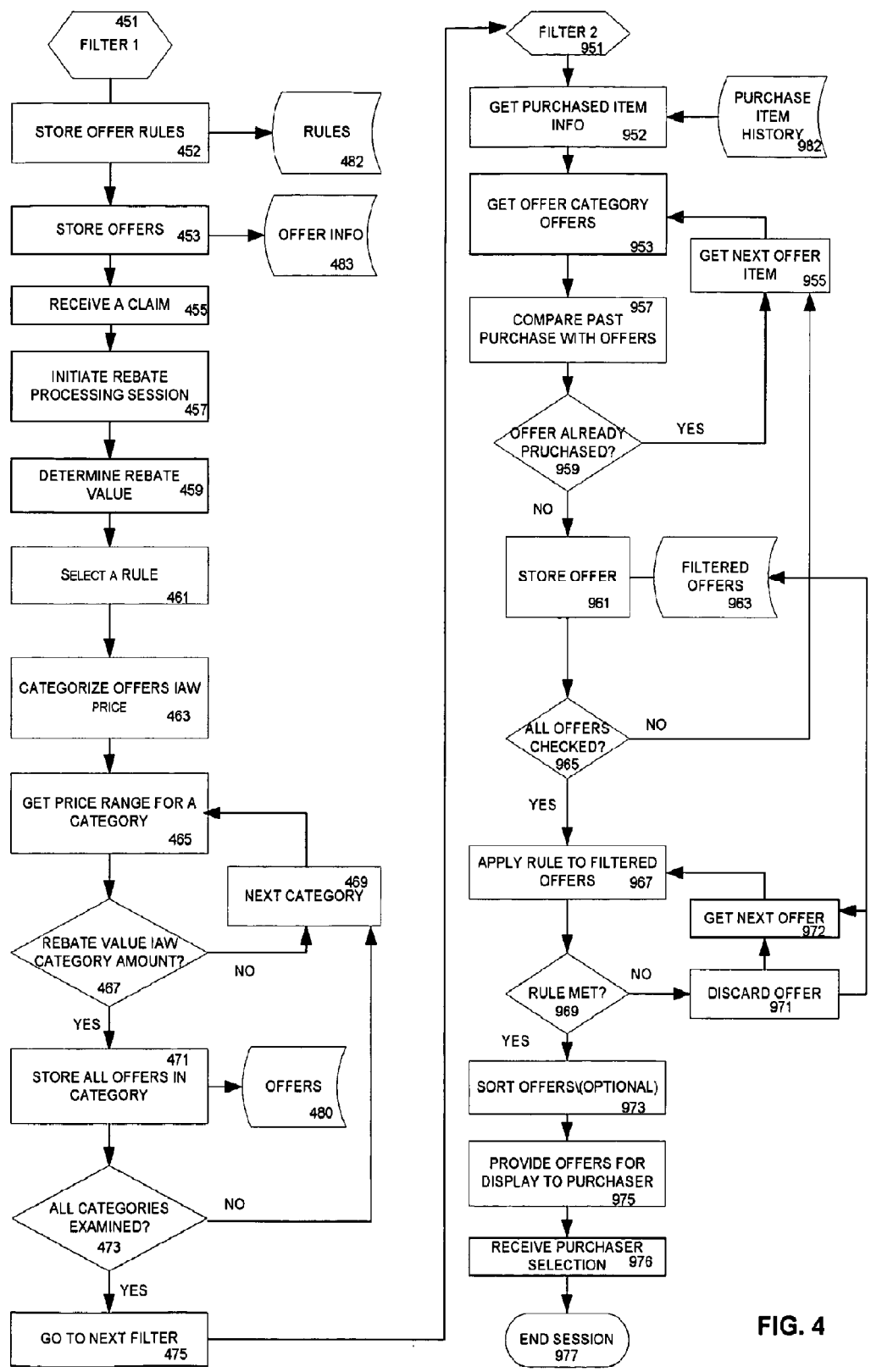
FIG. 4 is a flowchart illustrating a method for analyzing offers according to an embodiment of the invention.

FIG. 4 Method for Analyzing Offers

FIG. 4 is a flowchart of a method for analyzing offers according to an embodiment of the invention. A first filtering method 451 comprises steps of storing offer rules at 452. Offers are stored at step 453. At step 455 a claim is received from a purchaser. In response to receiving the claim at step 455 a rebate processing session is initiated at step 457. A value is determined for the rebate claim in step 459. At step 460 a rule is selected to be applied to the offers stored at step 453.

At step 463 stored offers are categorized by price range.

At step 465 a price range for a category is examined. At step 467 a determination is made if the examined price range is within a range of the rebate value. The range is determined by the rule selected in step 461. If the result is "yes" at step 471 all offers in the category are stored. At step 473 a determination is made whether all categories have been examined for price. If the answer is "no" a next price category is examined. Step 467 is repeated to determine if prices in the next category are within the price range allowed by the rule selected in step 461. The method steps repeat until all categories have been examined and all offers within the "spread" of the rebate value allowed by the rule have been stored. In some embodiments of the invention, these offers are then provided for display by a user system.

In another embodiment of the invention, the method continues to a second filter at step 475. The second filter method begins at step 951. Information about items previously purchased by this purchaser is obtained at step 952. Offers stored in step 471 are examined in step 953. At step 957, information about the stored offers is compared with information about previously purchased items. Step 959 determines if an offer was previously purchased. If an offer was previously purchased the next offer is retrieved at step 955. If an offer had not been previously purchased the offer is stored at step 962 in a filtered offer memory 963.

Next a determination is made at step 965 if all offers have been checked. If all offers have not been checked, the next offer stored by applying the first filter is obtained. Then steps 953 through 965 are repeated until step 965 determines that all offers have been checked. If all items have been checked the rule selected at step 461 is applied to all offers in the filtered offer memory 963 at step 967. Step 969 determines if the rule conditions are met for each offer in offer memory 963. If the rule conditions are not met the offer is discarded, for example, by removing the offer from the filtered offers memory 963. Then the next offer is obtained in step 972. Steps 967 through 972 repeat until all offers in the filtered offers memory have been compared to the rule. For those offers meeting the conditions of the rule, the method optionally proceeds to step 973. Step 973 carries out a sorting operation on the offers remaining in the filtered offers memory 963.

Whether or not the sorting step is carried out, step 975 provides the offers in the filtered offer memory for display by a purchaser system to a purchaser. At step 976 a purchaser offer selection is received. At any time subsequent to receiving a purchaser's selection of an offer, a step of ending the rebating processing session may be carried out.

Figure 5:
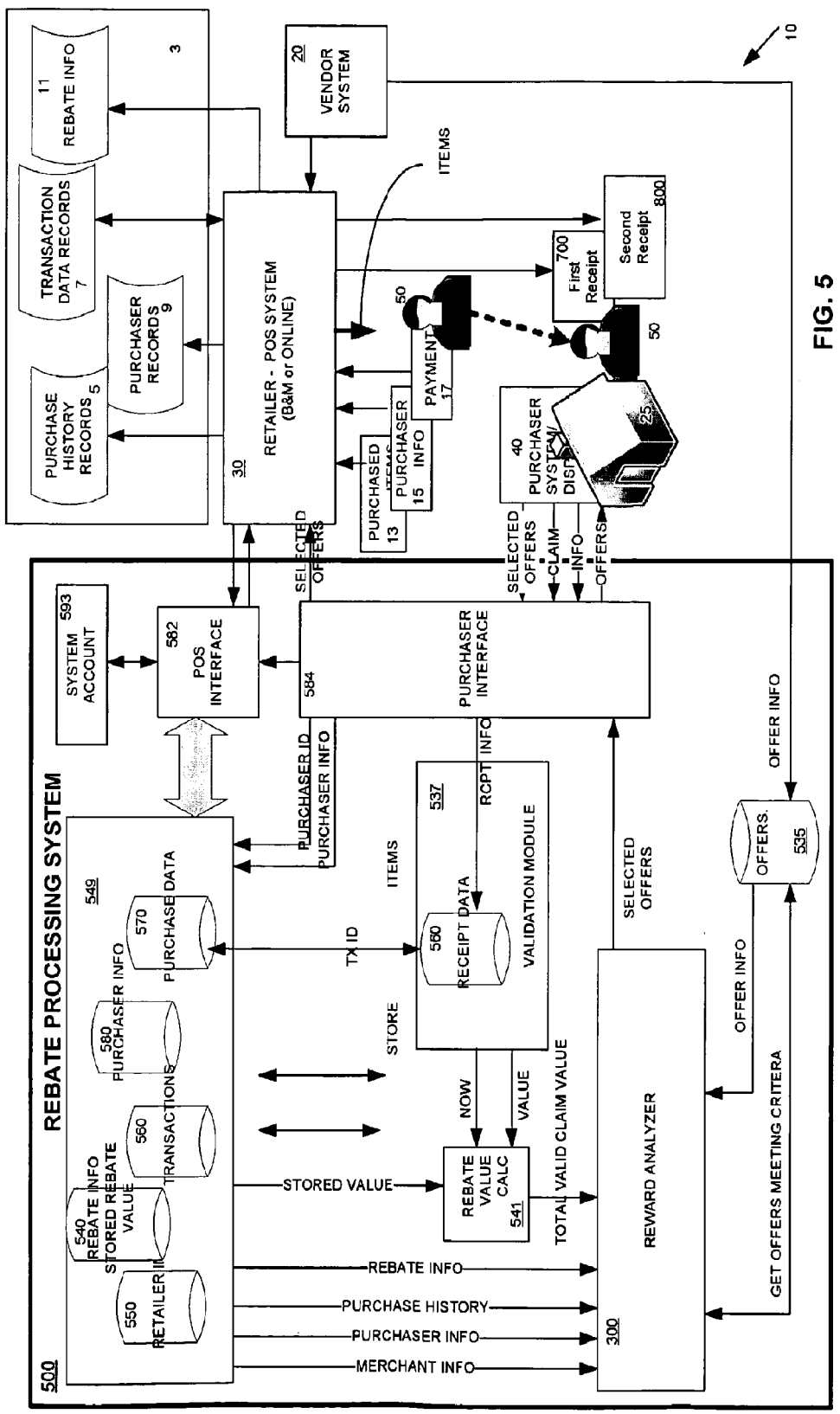
FIG. 5 is a detailed block diagram of a system for processing rebates according to an embodiment of the invention.

FIG. 5 Rebate Processing System—Detailed Block Diagram

FIG. 5 is a block diagram of a rebate processing system 500 according to an embodiment of the invention. The system 100 of FIG. 5 illustrates further details of the example rebate processing system 100 illustrated in FIG. 1

POS System 30

As illustrated in FIG. 5, rebate processing system 500 comprises at least one point of sale POS system 30 coupled to a data storage unit 3. POS system 30 comprises a computerized system that receives purchase data related to retail sales of products or services. According to some embodiments of the invention POS system 30 comprises a computer server that receives electronic orders over a global computer information network. Data related to a purchase transaction is provided to POS system 30 either by manual entry by an operator, for example, a cashier operating an electronic cash register or by scanning a Universal Product Code (UPC) supplied on product packaging.

The received data is provided to data storage unit 3 for storage. Data storage unit 3 stores electronic data records related to transactions, purchasers, receipts, rebates, vendors and other information associated with retail and rebate operations. A wide variety of systems configured for recording and processing purchases at a point of sale are suitable to comprise POS system 30 and storage unit 3.

For example, a purchaser 50 purchases at least one item from a retailer via POS system 30. Information related to the purchase is entered into POS system 30 at the time of the purchase transaction. In some cases, purchaser information is also entered into POS system 30 at the time of a transaction. At the conclusion of the purchase transaction a first receipt 700 (best illustrated in FIG. 7) is issued to purchaser 50 by POS system 30. First receipt 700 includes a listing of purchased products and services.

Further, first receipt 700 includes a unique transaction identifier 701. Transaction identifier 701 comprises a serialized indicator uniquely identifying each respective purchase transaction executed by POS system 30. In some embodiments of the invention such a transaction code comprises a Universal Product Code (UPC) barcode and a UPC is imprinted on every receipt 700.

A record is created and stored in memory unit 7 for each transaction identifier representing a completed transaction of POS system 30. Table 1 provides an example of a transaction record associated with a sales transaction carried out by POS system 30. Table 2 provides an example of a purchaser record comprising purchaser information stored in memory unit 9 of data storage unit 3. Table 3 provides an example of a purchase history record stored in memory unit related to transaction carried out by POS system 30. Table 3 provides an example of a purchase history record stored in memory unit 5 of data storage unit 3.

TABLE 1 rps_transaction

| | |
|---|---|
| PK | transaction_id |
| | td_retailerid |
| | td_batchdate |
| | td_batchid |
| I1 | td_storeno |
| I1 | td_laneno |
| I1 | td_trxno |
| I1 | td_date_time |
| | td_cuid |
| I2 | td_custno |
| | td_itemidtype |
| I1 | td_itemid |
| | td_qty |
| | td_extprice |
| | td_origstoreno |
| | td_origlaneno |
| | td_origtrxno |
| | td_origdate_time |
| | td_origcustno |
| | source |

TABLE 2 rps_user

| | |
|---|---|
| PK | user_id |
| | user_title |
| | user_fname |
| | user_lname |
| | user_mname |
| | user_address1 |
| | user_address2 |
| | user_city |
| | user_state |
| | user_zip |
| | user_phone |
| | user_email |
| | user_level |
| | user_has_new_items |
| I1 | card_id |
| FK1 | hh_id |
| | created_date |
| | modified_date |

TABLE 3 rps_purchase_history

| | |
|---|---|
| PK | entry_id |
| FK3, I1 | user_id |
| FK2, I4 | transaction_id |
| I2 | transaction_date |
| FK1, I3 | item_id |
| | price |
| | quantity |
| | card_number |
| | created_date |
| | modified_date |

As will be readily appreciated by the skilled artisan upon reading this specification, many forms and formats are suitable for implementing a transaction identifier, also referred to herein as a serial number, according to various embodiments of the invention. Regardless of specific format of a transaction serial number, the transaction serial number identifies a specific transaction at POS 30. For example a transaction id is used by a purchaser when returning an item to a retailer. In that case the transaction id is matched to stored transaction data, for example, memory unit 7 cross referenced to memory unit 5 to verify the purchase price of the item being returned. Some embodiments of the invention employ a transaction serial number to verify rebate claims. Other embodiments of the invention employ a different unique number suitable for keeping track of purchased items and transactions associated with a rebate program.

In some embodiments of the invention a second receipt 800 is issued to purchaser 50 when items qualified for a rebate are purchased. Second receipt 800 provides a dedicated accounting of at least one purchased product having a rebate offer associated therewith. For example, a purchaser may buy 50 items in a single transaction, of which only 5 items have associated product rebate offers. As a reminder to a purchaser that they have qualified for rebates, a dedicated accounting of just the rebate items may be provided in a special section of first receipt 700 or in a separate second receipt 800.

In some embodiments of the invention a purchaser is provided with both a first receipt 700 and a second receipt 800. In one embodiment a first receipt 700 comprises an accounting of all purchases in the qualified transaction, including items without associated rebate offers. A second receipt 800 comprises a record of the serial number of the transaction and a dedicated accounting of only purchased products associated with rebate offers.

An example of information stored in a POS system about a receipt and purchased items is illustrated in Tables 4 and 5.

TABLE 4 rps_receipt

| | |
|---|---|
| PK | receipt_id |
| FK1, I4 | user_id |
| I6 | receipt_type |
| I5, I3, I2, I1 | receipt_date |
| I1 | receipt_store_number |
| I1 | receipt_register_number |
| I1 | receipt_transaction_number |
| | receipt_amount |
| I2 | receipt_web_order_num |
| I2 | receipt_web_order_sku |
| I3 | receipt_order_num |
| I3 | receipt_invoice_num |
| | receipt_status |
| I7 | receipt_source |
| | orig_receipt_id |
| | reward_type |
| | old_reward_type |
| | user_agent_ip |
| | locked |
| | created_date |
| | created_by |
| | modified_date |

TABLE 5 pc_item

| | |
|---|---|
| PK | item_id |
| FK1, I3 | brand_id |
| I1 | item_sku |
| I2 | item_article |
| | item_name |
| | item_image |
| | item_price |
| | created_date |
| | modified_date |

Purchaser System 40

Network 10 further comprises a purchaser system 40 configured for communication with rebate processing system 100. In one embodiment of the invention purchaser system 40 comprises a personal computer located, for example at the home 25 of a purchaser 50. In other embodiments purchaser system 40 comprises a kiosk located at a store, mall or some location other that the home of purchaser 50. Regardless of location purchaser system 40 is configured to enable purchaser 50 to access rebate processing system 100 for the purpose of submitting a rebate claim.

For example, an in-store kiosk may be directly linked to the rebate processing system 100 or, where an administrator enters data into rebate processing system from a paper form submitted by purchaser 50, the administrator may be directly linked to the rebate processing system 100 without the need to first access the internet or the world-wide-web. A direct link to the rebate processing system 100 may provide a more secure connection than a connection through the internet. Thus direct links may be appealing to certain purchasers wishing to take advantage of an in-store kiosk. Furthermore, access to rebate processing system 100 may also be by telephone without the use of a computer terminal.

Purchaser 50 makes a rebate claim using purchaser system 40 by interacting with a graphical user interface (GUI) provided by rebate processing system 100. Purchase 50 enters a least one transaction serial number corresponding to at least one transaction. In some embodiments of the invention purchaser 50 further provides purchaser identification information, such as personal information about the purchaser. Example of identifying information include, but are not limited to name and address, phone number, e-mail address, demographic information, and the like.

Vendor System 20

Network 10 further comprises a vendor system 20 configured for communication with POS system 30. One example of a vendor system is a manufacturer system storing information relating to products and services that are candidates for offers to a purchaser during a rebate redemption session. The purchaser may opt to apply the value of the rebate being redeemed to the purchase price of an offer. In that manner a purchaser is enabled to immediately apply a redeemed rebate value toward a purchase of an additional products or services.

In one embodiment of the invention vendor system 20 comprises a source of information related to offers. Vendor system 20 is further configured to communicate with rebate processing system 500 to electronically transfer information from vendor system 20 to an offer storage module 535 of system 500. While only one vendor system is illustrated in FIG. 5, the invention is not limited with respect to the number of vendor systems communicating with POS system 30 nor is the invention limited with respect to the number of vendor systems 20 communicating with rebate processing system 500. In some embodiments of the invention offer storage system 535 stores offers from a plurality of vendors. In some embodiments of the invention offer storage system 535 comprises a source of information about offers. Table 4 provides an example of information about offers stored in offer storage system 535.

TABLE 6

| | rps_offer |
|---|---|
| PK | offer_id |
| | offer_number |
| | offer_title |
| | offer_official_name |
| | offer_start |
| | offer_end |

TABLE 6-continued

| | rps_offer |
|---|---|
| PK | offer_id |
| | offer_scope |
| | offer_reward |
| | offer_reward_noun |
| | offer_disclaimer |
| | offer_additional_info |
| | offer_image_small |
| | offer_image |
| | offer_enabled |
| | offer_priority |
| | offer_limit |
| | offer_share_items |
| FK1 | processor_id |
| | created_date |
| | modified_date |

Purchaser Interface

Rebate processing system 500 accessed may be accessed by a purchaser 50 in a number of ways. In one embodiment of the invention purchaser interface unit 584 provides graphical user interfaces (best illustrated in FIGS. 9-13) enabling purchaser 50 to interact with rebate processing system 500. Purchaser interface unit 584 enables purchasers, such as purchaser 50, to transmit information about themselves, a product order, a credit card number, a rebate claim and the like to rebate processing system 500. In another example, purchaser 50 may access the rebate processing system 500 by accessing a menu choice on a website of the retail network offering the rebate program. (Example illustrated in FIG. 9 at 901.) For an online retailer, purchaser 50 may, for example, be immediately linked to the rebate processing system 500 after completing a qualifying purchase. The purchaser 50 may also access the rebate processing system 500 directly.

Certain manufacturers may also wish to provide links from the manufacturer's website to a rebate processing center 500 that offers the manufacturer's rebates to purchasers. Thus, although the rebate processing system 500 may appear to the purchaser 50 to be a part of, for instance, a drug store's website, it may in fact be an independently operated rebate processing system 500 website that is linked to the drug store's website.

When the purchaser 50 accesses the rebate processing system 500 a second or subsequent time, the system may automatically recognize the purchaser 50 after the purchaser enters only a portion of the personal information transmitted during the first access session. For example, after entering only name and zip code, the purchaser's phone number, address and other portions of purchaser 50's personal information may be supplied by system 100. In such case, the rebate processing system 500 may interactively fill-in portions of GUI 1000 with the remainder of their personal information upon entry of the partial information. The partial personal information transmitted by the purchaser 50 may require no entry at all, but instead may merely comprise information automatically transmitted by the purchaser 50, such as a "cookie" saved on the purchaser 50's computer from a previous visit to the rebate processing system 500.

Recognizing the purchaser 50 on subsequent visits may be used in conjunction with the method where the purchaser 50 may enter multiple serial numbers during multiple access sessions within the same qualifying time period, or can also be used where the same purchaser 50 makes rebate claims under multiple programs within different qualifying time periods. Thus, a single purchaser 50 may only have to enter personal information into the system a single time. This single entry may be for a single retail network, or, because the fulfillment administrator may service several different retail networks each having different coordinated rebate offers, the single entry of personal information may establish an account with the fulfillment administrator that may be used for multiple retail networks.

Thus, a purchaser 50 entering an internet rebate claim for a drug store chain by accessing that drug store chain's website may later access an office supply store's website and find that they do not need to enter detailed personal information again. This may occur where the same fulfillment administrator services both retail networks and the personal information data is shared across both rebate programs. In addition to having a streamlined entry process available to the purchaser 50 for subsequent entries, the purchaser 50 on a subsequent visit may further be able to check the status of a pending rebate submission, check their account history, or have a choice of other options.

System Administrator

The rebate processing system 500 as described in this invention typically comprises a computer interface residing on a powerful computer server capable of processing multiple requests from multiple users and purchasers simultaneously. An "administrator" is any person authorized by a competent authority to interact with system 500 for the purpose of facilitating the processing of rebate claims.

Data Storage Module 549

System 500 further comprises a data storage module 549. System 500 receives an electronic data transfer (EDT) from POS system 40. The electronic data transfer may be in the form of a transfer across a computer network, such as a global computer information network or a direct-dial, secure-access computer network, or may be in the form of a tangible electronic storage device containing the electronic file. The term electronic data transfer includes any type of electronic means known in the art for transferring data from one system to another, including protocols typically referred to as electronic file transfers, or using simple object access protocol (SOAP) technology. Any means for transfer may be used.

Data storage module 549 stored data records, data for each purchaser 50 as received from POS system 40. Storage 560 Purchase Data Record The electronic file comprises a purchase data record for each qualified transaction involving at least one designated product. Each purchase data record includes transaction serial number. Each purchase data record comprises, for example, the list of products purchased, the date, and the transaction serial number for a qualified transaction in which at least one designated product was purchased by any purchaser 50. The purchase record may also comprise other data such as, for example, the store number.

Storage 570 Stored Data Records

Where the retailer already has personal information about the purchaser 50, such as through a loyalty card system or a warehouse club membership, the identifying information may merely be a membership number or loyalty card number. The fulfillment administrator then stores the personal information and the serial numbers transmitted by the purchaser 50 as a stored data record in step 130. The data may be stored by any electronic means known in the art, which may include the same computer server on which the rebate processing system 100 resides, or may be a different, interconnected data storage device to which the networked computer can write and store data.

Storage 580 Purchaser Info

From the information submitted by the purchaser 50, a marketing record for each purchaser 50 may be compiled. Each marketing record may comprise the personal information about the purchaser 50 and one or more purchaser 50 purchasing preferences derived from the purchase data records of the qualified transactions for which the purchaser 50 transmitted a corresponding serial number in step 120. A "purchaser 50 purchasing preference" may be simply the full list of items purchased during a transaction, or it may be information extrapolated from a purchase data record and analyzed to determine purchaser preferences. Table 3 discussed above with reference to POS system 30 provides an example of a source of data related to a purchaser's preferences, in this case the data is a purchase history of a purchaser.

For example, the purchaser 50 purchasing preference may show that the purchaser 50 is a good candidate for cat products, based on information in the purchase data record showing purchase of cat food. This marketing record may then be provided to a marketing agent, such as a marketing agent of the retail network who may then target the purchaser 50 to receive special offers related to products or types of products that they routinely purchase. The marketing agent may optionally be the rebate processing system administrator or someone authorized by the system administrator to perform such services, a product manufacturer, or a third party having an interest in purchaser 50s with certain purchasing habits.

In one embodiment of the invention a purchaser 50 purchases products designated for rebates using a designated card. In that case POS system 30 transfers a purchase data record to rebate processing system 500 via electronic data transfer. The transferred purchase data record comprises (i) the transaction serial number, (ii) the designated card number, (iii) the transaction date (where there is a fixed expiration date for the rebate), and (iv) the list of products purchased by the purchaser 50. A purchase data record may also comprise other data such as, for example, the store number.

The list of products purchased in the purchase data record typically comprises all of the items purchased in a transaction, not just the rebate items. To minimize the size of the file to be electronically transferred, however, some embodiments of the invention may transmit a purchase data record limited to only items having rebate offers. Implementations of such a limitation employ software at POS system 30 to identify rebate items. For example software utilized for issuing a secondary receipt as described above is used to identify rebate items. To further minimize the size of the data transfer, the transfer from the POS system may be in response to an inquiry from the rebate processing system 500 in which only data for transaction codes received at the rebate processing system 500 are requested.

Validation System

Rebate processing system 500 optionally comprises a validation module 537 to validate rebate claims. Validation module 537 comprises at least one data processor. Validation module 537 associates each serial number in each stored data record with each purchase data record containing an identical serial number. Thus, for each serial number transmitted by a purchaser 50 and stored as a stored data record, there is a corresponding purchase data record with the identical serial number received from POS system 30 by electronic data transfer Validation module 537 processes each purchase data record and associated stored data record to validate each rebate claim.

Although discussed primarily herein with respect to "identical serial numbers", it should be understood that the invention is also applicable to "matching serial codes," comprising codes that are not necessarily numbers and that are not necessarily identical. For example, any coding system that allows the codes to be subsequently matched may be used, including a method wherein only a portion of the code is important for rebate claim processing and therefore only that portion is identical.

In one embodiment of the invention rebate validation module 537 matches UPC codes contained in the purchase record with a database of valid UPC codes that fulfill various offers. Validation module 537 automatically verifies that the correct number of items was purchased and that the date of the purchase was within the qualifying period. In other embodiments validation module 537 automatically processes variable rebate offers by identifying the total amount based on the number of purchases, or by identifying the purchase price or substituting the maximum or minimum price if the purchase price is out of range. Thus, validation module 537 automatically determines from the purchase data record which product purchases have associated rebate offers, and keeps a running total of the total amount of rebates owed to each purchaser 50. A validated rebate claim can then optionally be checked for fraud, for example by comparing the name and address of the purchaser 50 to known databases.

Rebate Value Calculator

Rebate processing system 500 comprises a rebate value calculator 541 configured to determine a rebate value for at least one rebate claim received from purchaser system 20. Rebate value calculator 541 makes the determination based on stored information about the rebate associated with the claim. In one embodiment of the invention the information about rebate value is provided by a vendor of the product associated with a rebate. The information about rebate value is provided by the vendor to at least one of retailer POS system 30 and rebate processing system 500. In one embodiment of the invention system 500 periodically uploads information about rebate values from a retailer system to system 500 where the information is stored and made available to rebate calculator 541.

FIGS. 12 & 13 GUIs Providing Offers to a Purchaser 50

After a validated rebate has been cleared for issue to a purchaser 50, the cash value of all rebate claims submitted by the purchaser 50 and validated by system 500 is available for transfer to the purchaser 50. According to embodiments of the invention the value available for transfer to purchaser 50 is displayed on a graphical user interface, for example GUI 1200 illustrated in FIG. 12. GUI 1200 comprises at least one offer to sell a product or service to a purchaser while enabling the purchaser to apply at least a portion of the rebate value available for transfer to the purchaser.

For example, GUI 1200 indicates in a first portion of a display screen (for example at 1250) a value available for transfer to the purchaser. In the example of FIG. 12 the amount is $100.00. In a second portion of the display screen, for example at 1201 a first offer is displayed to the purchaser. In the example of FIG. 12 the first offer comprises a protection plan for a computer peripheral device. Where more than one offer is made to the purchaser a second offer is displayed in a third portion of the display screen, for example at 1203. In the example of FIG. 12 the second offer comprises a service for installing and configuring the peripheral device. A retail value of an offer, or combined offers is displayed in a fourth portion of the display screen, for example at 1260 in FIG. 12.

In some embodiments of the invention system 500 provides an incentive for a purchaser to apply his or her rebate value toward the purchase price of at least one offer. GUI 1200 illustrates an example of such an incentive in a sixth portion of display for example at 1215. In the example illustrated in FIG. 12 the incentive comprises a 15% increase in the rebate value available to the purchaser. Therefore a purchaser is enabled to apply $115.00 to purchases items offered by Acme by applying the purchasers available rebate value of $100.00. To select this option an interactive icon 1205 enables a purchaser to "redeem" now.

GUI 1200 includes an interactive icon 1207 enabling a purchaser to elect to redeem the rebate value indicated at 1250 by applying the value to purchase the first and second offers, Alternatively GUI 1200 provides an interactive icon 1209 in a fifth portion of the display screen enabling a purchaser to decline to purchase the offers.

FIG. 13 illustrates an example of a GUI 1300 enabling a purchaser to apply at least a portion of the purchaser's available rebate value to purchase an offer including products and services. GUI 1300 indicates in a first portion of a display screen (for example at 1317) a value available for transfer to the purchaser. In the example of FIG. 13 the available amount is indicated as $100.00. In a second portion of the display screen, for example at 1301 a first offer is displayed to the purchaser. In the example of FIG. 13 the first offer comprises a radio receiver. A second offer is displayed in a third portion of the display screen, for example at 1303. In the example of FIG. 13 the second offer comprises a car kit for the receiver of the first offer. A fourth offer is displayed in a fifth portion of the screen, for example at 1305. The fifth offer comprises a 3 month subscription to radio programming. A retail value of the combined offers is displayed in a sixth portion of the display screen, for example at 1320 in FIG. 13.

In the embodiments of the invention illustrated in FIG. 13 system 500 provides an incentive for a purchaser to apply his or her rebate value to purchase items from the retailer providing the offers. GUI 1300 illustrates an example of such an incentive in a sixth portion of display for example at 1312. In the example illustrated in FIG. 13 the incentive comprises a 15% increase in the rebate value available to the purchaser. Therefore a purchaser is enabled to apply $115.00 to purchases items offered by Acme by applying the purchaser's available rebate value of $100.00. To select this option an interactive icon 1311 enables a purchaser to "redeem" now.

GUI 1300 includes an interactive icon 1307 enabling a purchaser to elect to redeem the rebate value indicated at 1317 by applying the value to purchase the offers. Alternatively GUI 1300 provides an interactive icon 1320 enabling a purchaser to decline to purchase the offers.

Applying the Rebate Value

Finally, rebate processing system 500 comprises an account 593 for receiving the cash value of redeemed rebate claims and for providing payment of the cash value to a vendor to be applied to the purchase price of the vendor's offered product or service to the purchaser. Account 593 may comprise a credit card, a debit card, a bank account or other account mechanism adapted to receive debits and credits having cash value.

Figure 6:
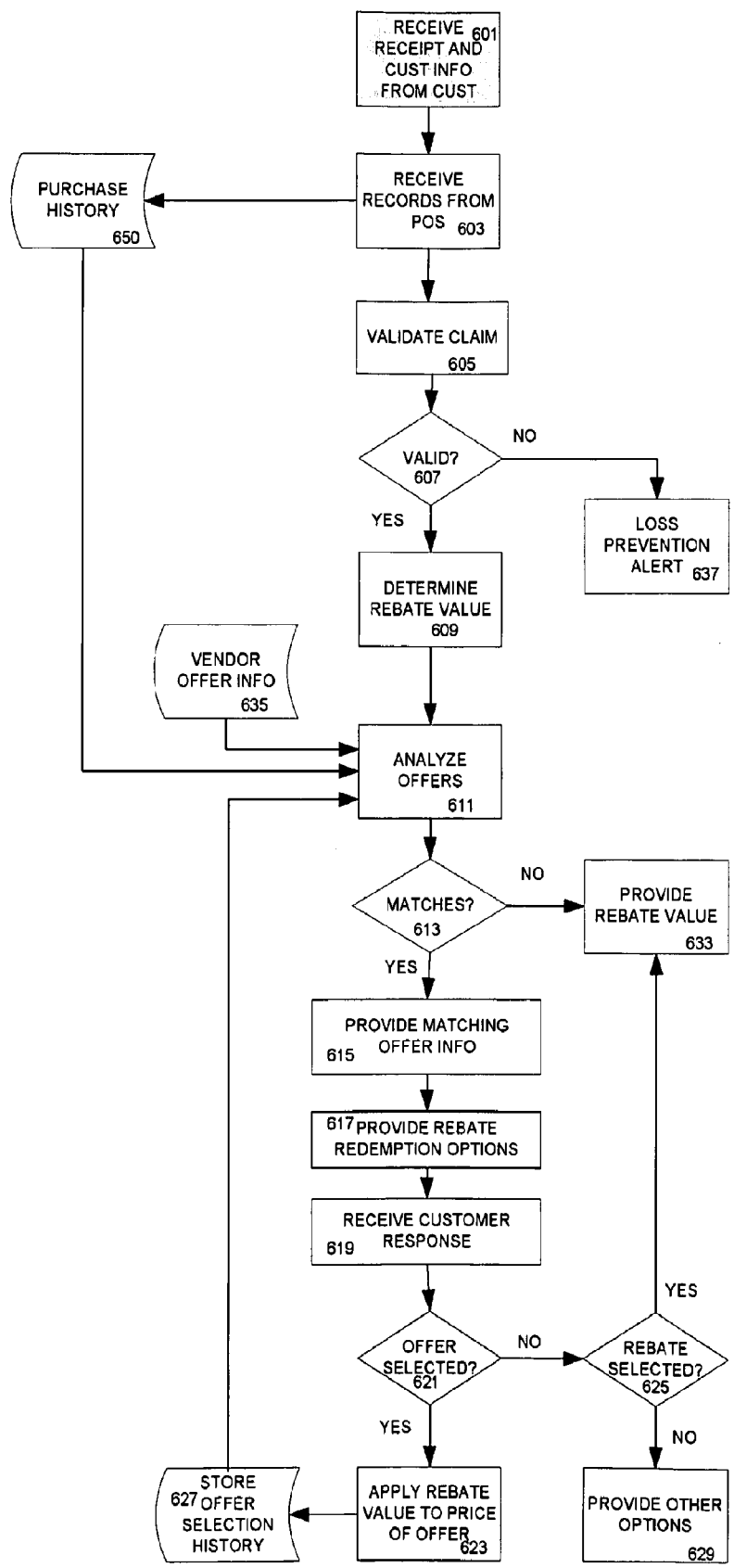
FIG. 6 is a flow chart

FIG. 6 Method for Processing Rebates

FIG. 6 is a flowchart illustrating steps of a method for processing rebates according to an embodiment of the invention. At step 601, information transcribed from a purchaser's receipt, and information about the purchaser is received. At step 603 records related to transactions and purchasers are received from a POS system. The records comprise a purchase history for each purchaser. The purchase histories are stored at step 650.

At step 605 the rebate claim is validated by comparing the information received in step 601 with the information received from a POS system in step 603 to determine if the information matches. If the claim is valid a value for the rebate is determined in step 609. According to one optional embodiment of the invention if the claim is not valid a loss prevention alert is generated at step 637.

At step 611 offers for sale of products and services from at least one vendor are analyzed. Information about the products and services of the at least one vendor is stored in a vendor offer storage device. In one embodiment of the invention vendors periodically update the information stored in the vendor offer storage device. In one embodiment of the invention the rebate value is compared with the retail sales price of offers stored in the vendor offer storage device. An analysis is carried out to determine if the retail price of an offer is within a predetermined range of the rebate value in step 611. The predetermined range is manually set by a system administrator in one embodiment of the invention.

If the offer price is within the predetermined range of the rebate value information about the offer is provided for virtually instant display to a purchaser via a display device of a purchaser computer system at step 615. At the same time, instructions for a purchaser to optionally apply the rebate value to purchase an offered good or service is provided at step 617. At step 619 a purchaser's response to the offer is received. If the offer is selected at least a portion of the rebate value determined in step 609 is applied to the purchase price of the selected offer at step 623. At step 627 information related to the purchased option and the rebate is stored. The information is made available for use in analyzing offers at step 611 for subsequent rebate claims of the purchaser.

If a purchaser declines to select an offer for purchase at step 621, step 625 is carried out to determine if conventional provision of rebate value is selected. If not other options may be provided according to the various embodiments of the invention as per step 629. If a conventional rebate value provision is selected at step 625 the purchaser is provided with the rebate value at step 33, for example, by issuing a check to the purchaser in the amount of the rebate value.

Figure 9:
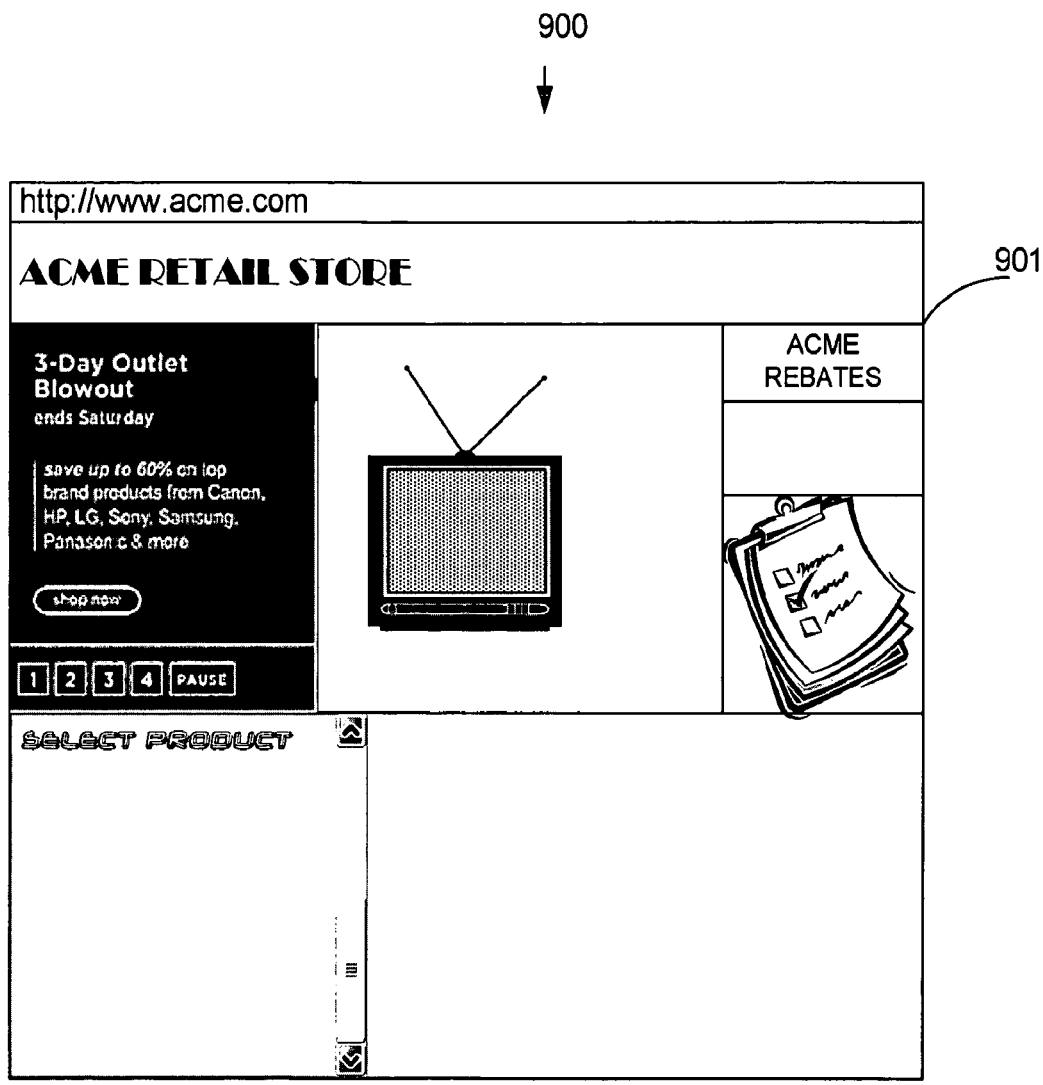
FIG. 9 illustrates a graphical user interface (GUI) provided by an embodiment of the invention enabling a purchaser to initiate a rebate redemption session.
Figure 11:
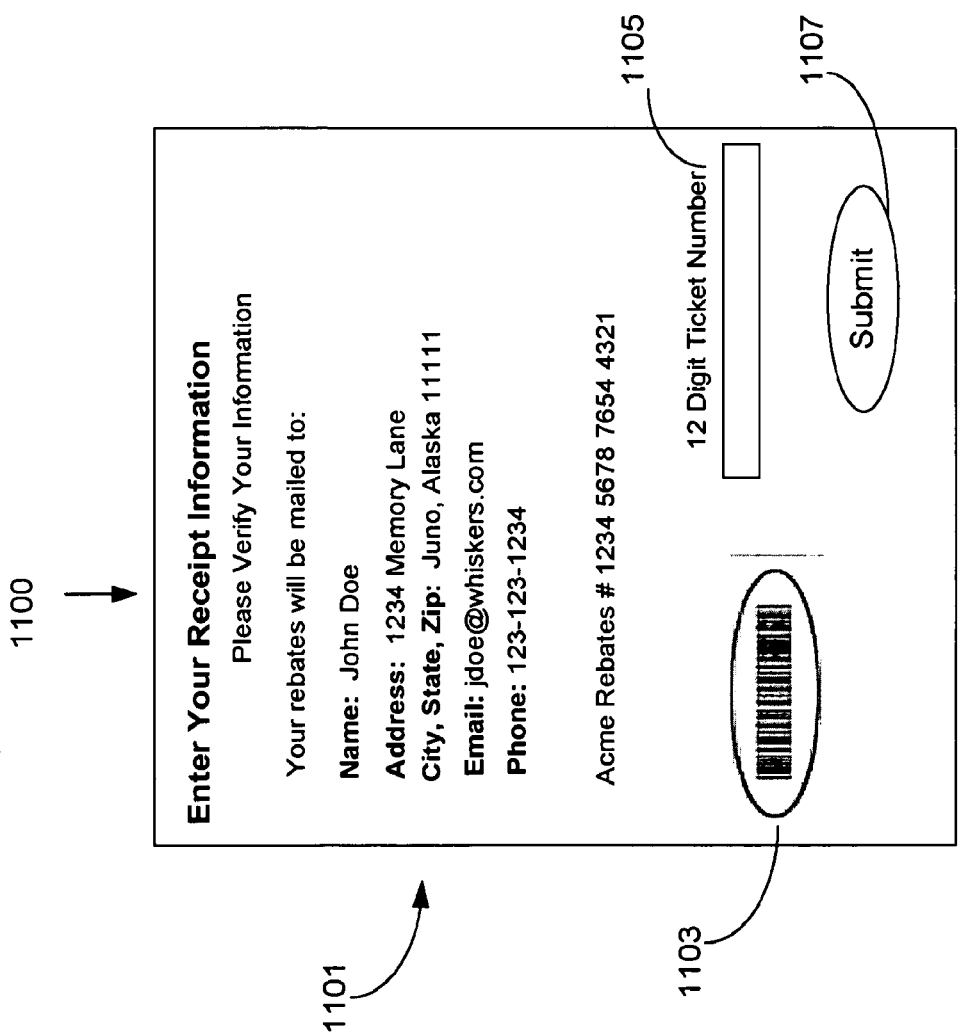
FIG. 11 illustrates a graphical user interface (GUI) provided by an embodiment of the invention enabling a purchaser to provide receipt information comprising a rebate claim during a rebate redemption session.

FIG. 9 illustrates a graphical user interface (GUI) provided to a purchaser in accordance with an embodiment of the invention enabling the purchaser to initiate a rebate redemption session. FIG. 10 illustrates a graphical user interface (GUI) provided in accordance with an embodiment of the invention enabling a purchaser to provide purchaser information. FIG. 11 illustrates a graphical user interface (GUI) provided in accordance with an embodiment of the invention enabling a purchaser to provide receipt information during a rebate redemption session.

It will be understood the various systems and components described herein may be separate devices as or may be integral portions of a single computer or server, or may be interconnected communicating components of a computer network. Storage and receiving devices described herein may include disk drives, tape drives, CD-ROMs, or any other means for storing electronic information known in the art.

What is claimed is:

1. A system for processing rebates comprising: a rebate value calculator configured to calculate a rebate value for at least one rebate claim received from a purchaser system during a rebate claim processing session; a source of information related to a purchaser; a source of information related to items for sale; an offer analyzer coupled to said source of information related to said purchaser and to said source of information related to said items, said offer analyzer selecting at least one of said items to be offered to said purchaser during said session, the selection based, at least in part, upon said information related to said offers, said information related to said purchaser and said calculated rebate value.

2. The system of claim 1 further comprising a purchaser interface coupled to said offer analyzer and configured for communication with said purchaser system to provide a graphical user interface for enabling said purchaser system to display said offer to said purchaser during said session.

3. The system of claim 2 wherein said graphical user interface is configured to enable said purchaser to select, during said session, said at least one offer to be provided to said purchaser.

4. The system of claim 2 wherein said graphical user interface is configured to enable said purchaser to apply said calculated rebate value to reduce a purchase price of said selected at least one offer.

5. The system of claim 1 wherein said offer analyzer comprises: a logic unit coupled to an offer module, said logic unit implementing rules for selecting offers from said offer module; a rules module coupled to said logic unit and to an administrator system for adjusting said rules in accordance with administrator instructions.

6. The system of claim 1 further comprising: a product offer module coupled to said redemption history module; and a redemption history analyzer coupled to said memory, a product offer module coupled to said redemption history module, said product offer module comprising a plurality of product offers; said redemption history analyzer determining at least one product offer to be offered to said consumer based on analysis of redemption history associated with said consumer.

7. A method for processing rebates comprising steps of: initiating a rebate claim processing session between a rebate claim processing system and a purchaser system; determining a value of a rebate claim received from a purchaser during said session; receiving purchaser information from a source of purchaser information during said session; receiving information related to items offered for sale by a vendor during said session; during said session, selecting at least one of said items to be offered for sale to said purchaser based, at least in part on said value, said purchaser information and said item information.

8. The method of claim 7 further including steps of: during said session offering selected items to said purchaser in response to receiving said rebate claim; receiving an indication of purchaser selection of at least one of said offered items; applying at least a portion of said rebate value toward the purchase price of said selected at least one item; providing said at least one item to said purchaser in lieu of providing said portion of said rebate value.

9. A method for providing rebates comprising steps of: receiving from a purchaser information related to a rebate; receiving from at least one vendor information related to at least one offer; determining the value of said rebate; offering said at least one offer to said purchaser; if said purchaser elects to purchase said at least one offer, applying at least a portion of the value of said rebate to the purchase price of said at least one offer.

* * * * *